(12) United States Patent
Flewitt et al.

(10) Patent No.: US 11,346,814 B2
(45) Date of Patent: May 31, 2022

(54) RESONATOR FOR THE DETECTION OF A MASS ANALYTE AND METHOD FOR OPERATION OF THE RESONATOR

(71) Applicant: Cambridge Enterprise Limited, Cambridge (GB)

(72) Inventors: Andrew Flewitt, Cambridge (GB); Ewelina Wajs, Cambridge (GB); Girish Rughoobur, Cambridge, MA (US)

(73) Assignee: Cambridge Enterprise Limited, Cambridge (GB)

( * ) Notice: Subject to any disclaimer, the term of this patent is extended or adjusted under 35 U.S.C. 154(b) by 0 days.

(21) Appl. No.: 16/970,603

(22) PCT Filed: Feb. 15, 2019

(86) PCT No.: PCT/EP2019/053873
§ 371 (c)(1),
(2) Date: Aug. 17, 2020

(87) PCT Pub. No.: WO2019/158721
PCT Pub. Date: Aug. 22, 2019

(65) Prior Publication Data
US 2021/0088477 A1     Mar. 25, 2021

(30) Foreign Application Priority Data
Feb. 19, 2018 (GB) ...................................... 1802659

(51) Int. Cl.
*G01N 29/036* (2006.01)
*G01N 29/02* (2006.01)
*G01N 29/24* (2006.01)

(52) U.S. Cl.
CPC ......... *G01N 29/036* (2013.01); *G01N 29/022* (2013.01); *G01N 29/2437* (2013.01); *G01N 2291/014* (2013.01)

(58) Field of Classification Search
CPC ... G01N 2291/014; G01N 2291/02466; G01N 2291/0255; G01N 2291/0256;
(Continued)

(56) References Cited

U.S. PATENT DOCUMENTS 5,932,953 A     8/1999  Drees et al.
7,914,740 B2 *  3/2011  Zhang ................ G01N 29/2437
                                                        422/68.1
(Continued)

FOREIGN PATENT DOCUMENTS

WO   WO 2013/088163   6/2013
WO   WO 2014/190292   11/2014
WO   WO 2018/206720   11/2018

OTHER PUBLICATIONS

Gabl et al., (2003) "First Results on Label-Free Detection of DNA and Protein Molecules Using a Novel Integrated Sensor Technology Based on Gravimetric Detection Principles", Biosensors and Bioelectronics, 19(6): 615-620.
(Continued)

*Primary Examiner* — Francis C Gray
(74) *Attorney, Agent, or Firm* — Rudy J. Ng; Bozicevic Field & Francis LLP (57) ABSTRACT

A resonator is disclosed for the detection of a mass analyte, such as a biological analyte. The resonator has: a piezoelectric layer formed of a piezoelectric material; a first resonator region and a second resonator region each occupying a corresponding region of the piezoelectric layer; electrodes disposed to apply a driving signal to the piezoelectric layer to generate bulk acoustic waves, the electrodes being common to the first resonator region and the second resonator
(Continued)

region. In operation, the first resonator region has a first resonant frequency and the second resonator region has a second resonant frequency. The first resonator region and the second resonator region differ from each other in that the first resonator region is adapted to receive a mass analyte for the mass analyte selectively to attach to a surface of the first resonator region. In operation, attachment of the mass analyte selectively at the first resonator region causes a greater frequency shift in the first resonant frequency than in the second resonant frequency. Also disclosed is a corresponding method for the detection of a mass analyte.

14 Claims, 9 Drawing Sheets

(58) Field of Classification Search
CPC ......... G01N 2291/0426; G01N 29/022; G01N 29/036; G01N 29/2437; G01N 29/30; G01N 29/4436
See application file for complete search history.

(56) References Cited

U.S. PATENT DOCUMENTS

| | | | | |
|---|---|---|---|---|
| 9,255,912 | B2* | 2/2016 | Johnston | G01N 29/036 |
| 11,146,235 | B1* | 10/2021 | Aigner | H03H 9/0211 |
| 2004/0150296 | A1 | 8/2004 | Park et al. | |
| 2005/0148065 | A1 | 7/2005 | Zhang et al. | |
| 2012/0068690 | A1* | 3/2012 | Song | G01N 29/036 324/76.39 |
| 2016/0116444 | A1* | 4/2016 | Webster | G01N 33/54373 422/69 |
| 2019/0068197 | A1* | 2/2019 | Bahr | H03K 3/013 |
| 2021/0211115 | A1* | 7/2021 | Zuo | H03H 9/02834 |

OTHER PUBLICATIONS

Aigner (2003) "MEMS in RF Filter Applications: Thin-film Bulk Acoustic Wave Technology", Sensors Update, 12(1): 175-210.
Barako et al., (2014) "Reactive Metal Bonding of Carbon Nanotube Arrays for Thermal Interface Applications", IEEE Transactions on Components, Packaging and Manufacturing Technology, 4 (12): 1906-1913.
Benes (1984) "Improved Quartz Crystal Microbalance Technique", Journal of Applied Physics, 56, 608-626.
Chen et al., (2011) "Film Bulk Acoustic Resonator Based Biosensor for Detection of Cancer Serological Marker", Electron. Lett. 47(21): 1169-1170.
Chen et al., (2012) "A Pure Shear Mode ZnO Film Resonator for the Detection of Organophosphorous Pesticides", Sensors Actuators B Chem. 171-172, 1081-1086.
Chen et al., (2013) "Highly Sensitive Detection of Organophosphorus Pesticides by Acetylcholinesterase-Coated Thin Film Bulk Acoustic Resonator Mass-Loading Sensor", Biosensors and Bioelectronics, 41, 163-167.
Chen et al., (2013) "Film Bulk Acoustic Biosensor for Detection of Trace Pesticide Residues in Agricultural Products", Electron. Lett. 49(15):924-925.
Clement et al., (2014) "On the Effectiveness of Lateral Excitation of Shear Modes in AlN Layered Resonators", Ultrasonics, 54(6): 1504-1508.
Demiguel-Ramos et al., (2013) "Induced Surface Roughness to Promote the Growth of Tilted-AlN Films for Shear Mode Resonators", Joint UFFC, EFTF and PFM Symposium 274-277.
Demiguel-Ramos et al., (2015) "Assessment of the Shear Acoustic Velocities in the Different Materials Composing a High Frequency Solidly Mounted Resonator", Ultrasonics, 62:195-199.
Demiguel-Ramos et al., (2015) "Optimized Tilted C-Axis AlN Films for Improved Operation of Shear Mode Resonators", Thin Solid Films 590:219-223.

Demiguel-Ramos et al., (2017) "Gravimetric Biosensor Based on a 1.3 GHz AlN Shear-Mode Solidly Mounted Resonator", Sensors and Actuators B 239:1282-1288.
Esconjauregui et al., (2015) "Carbon Nanotube Forests as Top Electrode in Electroacoustic Resonators", Applied Physics Letters, 107(13): 133106, 15 pages.
Flewitt et al., (2015) "ZnO Based SAW and FBAR Devices for Bio-Sensing Applications", Journal of Non-Newtonian Fluid Mechanics 222:209-216.
Futaba et al., (2006) "Shape-Engineerable and Highly Densely Packed Single-Walled Carbon Nanotubes and their Application as Super-Capacitor Electrodes", Nature Materials, 5: 987-994.
Gabl et al., (2004) "First Results on Label-Free Detection of DNA and Protein Molecules Using a Novel Integrated Sensor Technology Based on Gravimetric Detection Principles", Biosensors and Bioelectronics, 19(6): 615-620.
Garcia-Gancedo et al., (2011) "ZnO-Based FBAR Resonators with Carbon Nanotube Electrodes", IEEE Transactions on Ultrasonics, Ferroelectrics, and Frequency Control, 58(11):2438-2445.
Garcia-Gancedo et al., (2011) "Solidly Mounted Resonators with Carbon Nanotube Electrodes for Biosensing Applications", Joint Conference of the IEEE International Frequency Control and the European Frequency and Time Forum (FCS) Proceedings pp. 1-5.
Garcia-Gancedo et al., (2011) "AlN-Based BAW Resonators with CNT Electrodes for Gravimetric Biosensing", Sensors Actuators B Chem. 160(1): 1386-1393.
Garcia-Gancedo et al., (2012) "Dual-Mode Thin Film Bulk Acoustic Wave Resonators for Parallel Sensing of Temperature and Mass Loading", Biosens. Bioelectron. 38(1):369-374.
Garcia-Gancedo et al., (2013) "Direct Comparison of the Gravimetric Responsivities of ZnO-based FBARs and SMRs", Sensors Actuators, B Chem. 2013,183:136-143.
He et al., (2012) "Film Bulk Acoustic Resonator Pressure Sensor with Self Temperature Reference", Micromechanics Microengineering 22(12): 125005, 6 pages.
Hofmann et al., (2009) "State of Transition Metal Catalysts During Carbon Nanotube Growth", J. Phys. Chem., C, 113(5): 1648-1656.
Iborra et al., (2013) "Acoustic Properties of Carbon Nanotube Electrodes in BAW Resonators", Joint UFFC, EFIF and PFM Symposium 984-897.
International Search Report dated Jun. 4, 2019 issued on Application No. PCT/EP2019/053873, 15 pages.
Joddar et al., (2016) "Development of Functionalized Multi-Walled Carbon-Nanotube-Based Alginate Hydrogels for Enabling Biomimetic Technologies", Nature Scientific Reports, 6:32456:12 pages.
Katardjiev & Yantchev (2012) "Recent Developments in Thin Film Electro-Acoustic Technology for Biosensor Applications", Vacuum 86:520-531.
Lakin & Wang (1981) "Acoustic Bulk Wave Composite Resonators", Applied Physics Letters, 38:125-127.
Le et al., (2018) "A High Performance Humidity Sensor Based on Surface Acoustic Wave and Graphene Oxide on AlN/Si Layered Structure", Sensors Actuators, B Chem. 255:2454-2461.
Lee & Song et al., (2010) "Detection of Carcinoembryonic Antigen Using AlN FBAR", Thin Solid Films 518:6630-6633.
Lu & Lewis (1972) "Investigation of Film-Thickness Determination by Oscillating Quartz Resonators with Large Mass Load", Journal of Applied Physics, 43(11):4385-4390.
Lu et al., (2015) "Detection of Volatile Organic Compounds Using Microfabricated Resonator Array Functionalized with Supramolecular Monolayers", ACS Appl. Mater. Interfaces 7: 17893-17903.
Mann et al., (2010) "Controlling the Growth of Carbon Nanotubes for Electronic Devices", Microelectronic Engineering 87:1491-1493.
Mirea (2014) "Carbon Nanotube Forests as Top Electrodes for AlN-Based Electroacoustic Resonators", IEEE International Ultrasonics Symposium Proceedings, 1476-1479.
Nirschl et al., (2009) "Film Bulk Acoustic Resonators for DNA and Protein Detection and Investigation of in vitro Bacterial S-layer Formation", Sensors Actuators, A Phys. 156:180-184.
Olivares et al., (2015) "Growth of Carbon Nanotube Forests on Metallic Thin Films", Carbon 90: 9-15.

(56) References Cited

OTHER PUBLICATIONS

Pottigari & Kwon (2009) "Vacuum-Gapped Film Bulk Acoustic Resonator for Low-Loss Mass Sensing in Liquid", International Conference on Solid State Sensors and Actuators (Transducers) pp. 156-159.
Rai et al., (2010) "A Digitally Compensated 1.5 GHz CMOS/FBAR Frequency Reference", IEEE Trans. Ultrason. Ferroelectr. Freq. Control 57(3): 552-561.
Razafimandimby et al., (2006) "A Novel Architecture of a Tunable Bandpass BAW-Filter for a WCDMA Transceiver", Analog Integr. Circuits Signal Process. 49: 237-247.
Robertson et al., (2008) "Controlling the Catalyst During Carbon Nanotube Growth", Journal of Nanoscience and Nanotechnology 8:6105-6111.
Ruby (2007) "Review and Comparison of Bulk Acoustic Wave FBAR, SMR Technology", IEEE Ultrasonics Symposium pp. 1029-1040.
Rughoobur et al., (2016) "Room Temperature Sputtering of Inclined C-Axis ZnO for Shear Mode Solidly Mounted Resonators", Appl. Phys. Lett. 108, 34103: 5 pages.
Rughoobur et al., (2017) "Gravimetric Sensors Operating at 1.1 GHz Based on Inclined C-Axis ZnO Grown on Textured Al Electrodes", Sci. Rep. 7(1367): 1-9.
Sauerbrey (1959) "Use of Quartz Crystals for Weighing Thin Layers and for Micro weighing", Zeitschrift für Phys. 155, 206.
Search Report dated Aug. 10, 2018 issued on GB Application No. 1802659.1, 4 pages.
Singh et al., (2013) "Vertically Aligned Smooth ZnO Nanorod Films for Planar Device Applications†", J. Mater. Chem. C, 1: 2525-2528.
Sugime et al., (2014) "Growth Kinetics and Growth Mechanism of Ultrahigh Mass Density Carbon Nanotube Forests on Conductive Ti/Cu Supports", ACS Appl. Mater. Interfaces, 6: 15440-15447.
Treacy et al., (1996) "Exceptionally High Young's Modulus Observed for Individual Carbon Nanotubes", Nature, 381: 678-680.
Wang et al., (2003) "Peptides with Selective Affinity for Carbon Nanotubes", Nature Materials, 2:196-200.
Weber et al., (2006) "Shear Mode FBARs as Highly Sensitive Liquid Biosensors", Sensors and Actuators, A 128:84-88.
Win et al., (2011) "Viscosity Sensor Using ZnO and AlN Thin Film Bulk Acoustic Resonators with Tilted Polar C-Axis Orientations", Journal of Applied Physics 110 (094511): 11 pages.
Wingqvist et al., (2007) "Shear Mode AlN Thin Film Electro-Acoustic Resonant Sensor Operation in Viscous Media", Sensors and Actuators, B 123, 466-473.
Wingqvist (2010) "AlN-Based Sputter-Deposited Shear Mode Thin Film Bulk Acoustic Resonator (FBAR) for Biosensor Applications—A Review", Surface & Coatings Technology, 205: 1279-1286.
Xu et al., (2009) "In-Liquid Quality Factor Improvement for Film Bulk Acoustic Resonators by Integration of Microfluidic Channels", IEEE Electron Device Letters, 30(6): 647-649.
Xu et al., (2011) "A High-Quality-Factor Film Bulk Acoustic Resonator in Liquid for Biosensing Applications", Journal of Microelectromechanical Systems 20 (1):213-220.
Yanagitani et al., (2007) "Pure-Shear Mode BAW Resonators Consisting of (11-20)Textured ZnO Films", IEEE Transactions on Ultrasonics Ferroelectrics and Frequency Control pp. 4987-4992.
Yokoyama et al., (2012) "Analysis on Electromechanical Coupling Coefficients in AlN-Based Bulk Acoustic Wave Resonators Based on First-Principle Calculations", IEEE International Ultrasonics Symposium Proceedings pp. 551-554.
Zhang & Kim (2005) "Micromachined Acoustic Resonant Mass Sensor", Journal of Microelectromechanical Systems 14 (4): 699-706.
Zhang et al., (2010) "Label-Free Detection of Protein-Ligand Interactions in Real Time Using Micromachined Bulk Acoustic Resonators", Appl. Phys. Lett. 96(123702):3 pages.
Zhao et al., (2014) "Label-Free Detection of Human Prostate-Specific Antigen (hPSA) Using Film Bulk Acoustic Resonators (FBARs)", Sensors Actuators B Chem. 190:946-953.
Zhong et al., (2012) "Growth of Ultrahigh Density Single-Walled Carbon Nanotube Forests by Improved Catalyst Design", ASC NANO, 6(4): 2893-2903.

\* cited by examiner

RESONATOR FOR THE DETECTION OF A MASS ANALYTE AND METHOD FOR OPERATION OF THE RESONATOR

BACKGROUND TO THE INVENTION

Field of the Invention

The present invention relates to a resonator and to a method of operation of a resonator. The invention has particular, but not exclusive, applicability to a bulk acoustic wave resonator (BAWR), such as a thin film bulk acoustic wave resonator (FBAR) or a solidly mounted resonator (SMR). Such resonators are of use in sensor applications and sensor systems, such as in gravimetric-based sensing.

Related Art

It is known that FBARs and SMRs are of interest, for example, in the manufacture of gravimetric sensors, such as gravimetric biosensors. The selective attachment or adsorption of species at the surface of the sensor reduces the resonant frequency of the device. FBARs and SMRs are of particular interest for this application due to the potential for these devices to have high quality factor (Q), to allow relatively small shifts in resonant frequency to be detected, and as such are considered to be potentially more sensitive than quartz crystal microbalances (QCM). Typical QCM devices have resonant frequencies in the range 5-20 MHz, whereas BAWR devices can be formed with resonant frequencies of the order of 1.5 GHz. This significant rise in resonant frequency provides the key to increased sensitivity.

The present inventors have realised that resonators of the type discussed above may be manufactured to be exceptionally sensitive to the mass loading changes which they are designed to detect, but also may be sensitive even to very small changes in temperature or other environmental changes such as pressure changes.

WO 2013/088163, originating from the inventors' research group, discloses one approach to design a sensor based on a resonator device so that detectable resonances behave differently in response to temperature changes than in response to mass loading changes. In this way, WO 2013/088163 proposes that changes in the resonant frequency can be attributed to the correct cause, effectively providing an increase in sensitivity to mass loading by allowing the effect of temperature change to be stripped out. The approach taken in WO 2013/088163 is to provide a first layer formed of a piezoelectric material with a second layer formed of $SiO_2$ beneath the first layer and acoustically coupled with the first layer. During operation of the sensor, a first layer resonant frequency is detected, associated with the first layer, and a combination resonant frequency is detected, associated with a combination of the first and second layers. The temperature coefficient of frequency of the first layer is different to that of the second layer.

Operation of the device involves detecting a shift in one or both of the first layer resonant frequency and the combination resonant frequency. It is then possible to identify a portion of the shift caused by a temperature change at the sensor, and to identify another portion of the shift caused by a mass loading change at the sensor.

SUMMARY OF THE INVENTION

The approach taken in WO 2013/088163 is still considered to be of utility in identifying features of the shift in resonance behaviour that may be attributed to temperature variations at the resonator. However, the thermal properties of the $SiO_2$ layer are strongly influenced by the deposition conditions during manufacture. Similarly, variations in the deposition of any of the layers (and in particular of the top electrode) are seen. It can therefore be difficult to ensure reproducibility of the resonance response from one resonator to another. It would also be advantageous to provide a resonator with a simpler mechanism providing corresponding split resonance behaviour.

The present invention has been devised in order to address at least one of the above problems. Preferably, the present invention reduces, ameliorates, avoids or overcomes at least one of the above problems.

Accordingly, in a first preferred aspect, the present invention provides a resonator for the detection of a mass analyte, the resonator having:
 a piezoelectric layer formed of a piezoelectric material;
 a first resonator region and a second resonator region each occupying a corresponding region of the piezoelectric layer;
 electrodes disposed to apply a driving signal to the piezoelectric layer to generate bulk acoustic waves, the electrodes being common to the first resonator region and the second resonator region;
 in operation, the first resonator region having a first resonant frequency and the second resonator region having a second resonant frequency;
 wherein the first resonator region and the second resonator region differ from each other in that the first resonator region is adapted to receive a mass analyte for the mass analyte selectively to attach to a surface of the first resonator region,
 wherein, in operation, attachment of the mass analyte selectively at the first resonator region causes a greater frequency shift in the first resonant frequency than in the second resonant frequency.

In a second preferred aspect, the present invention provides a sensor device comprising an array of resonators according to the first aspect.

In a third preferred aspect, the present invention provides a method for detecting a mass analyte, the method comprising providing a resonator having:
 a piezoelectric layer formed of a piezoelectric material;
 a first resonator region and a second resonator region each occupying a corresponding region of the piezoelectric layer;
 electrodes disposed to apply a driving signal to the piezoelectric layer to generate bulk acoustic waves, the electrodes being common to the first resonator region and the second resonator region,
 the method further comprising
 operating the resonator to detect a first resonant frequency, corresponding to the first resonator region, and a second resonator frequency, corresponding to the second resonator region;
 selectively receiving a mass analyte at the first resonator region, attachment of the mass analyte selectively at the first resonator region causing a greater frequency shift in the first resonant frequency than in the second resonant frequency.

The first, second and/or third aspect of the invention may have any one or, to the extent that they are compatible, any combination of the following optional features.

The preferred embodiments of the present invention provide useful advantages in terms of simplicity of construction and operation. The provision of the first resonator region, whose resonant frequency is intended to shift on attachment of the mass analyte, and the second resonator region, on which mass analyte is not intended to attach, allows the effect of attachment of the mass analyte to be distinguished from other environmental effects that should affect each resonator region similarly. For this reason, it is advantageous that the first and second resonator regions are formed as parts of the same resonator. This allows the construction and operation of the first and second resonator regions, and their local environment, to be as similar as possible other than the features that adapt the first resonator region to have the mass analyte attach to the first resonator region. Preferably, therefore, the first and second resonator regions are disposed adjacent each other as parts of the same resonator.

The resonator preferably has a small size. This is useful for reasons of miniaturization and fabrication, but also provides advantages in terms of the uniformity of the local environment to which the first and second resonator regions are exposed. For example, the first and second resonator regions are preferably disposed contiguously with each other. They may have a combined areal size (footprint area, when viewed in plan view) of at most 1 mm².

Preferably, the resonator is of a type in which the electrodes sandwich the piezoelectric layer. There is typically a lower electrode on one side of the piezoelectric layer and an upper electrode on the opposing side the piezoelectric layer. In alternative embodiments, it is possible for the bottom electrode to be omitted, as shown for example in FIG. 1. In this case the resonator operates via capacitive coupling.

Preferably, the first and second resonant frequencies are each greater than 0.5 GHz. More preferably, the first and second resonant frequencies are each greater than 1 GHz. Providing a high frequency resonator allows the sensitivity of the device to be improved.

The resonator may be, for example, a solidly mounted resonator (SMR) with an acoustic wave reflector structure arranged under the piezoelectric layer and electrodes. The resonator may alternatively have a diaphragm configuration.

In operation, preferably none of the mass analyte attaches to the second resonator region. This may be assisted, for example, by the provision of a shield to shield the second resonator region from the mass analyte.

The first resonator region may comprise a mass analyte receiving layer. The mass analyte receiving layer may comprise a metal layer. Where the resonator has an upper electrode formed over the piezoelectric layer, the mass analyte receiving layer may be formed over the upper electrode. In contrast, a corresponding mass analyte receiving layer is preferably not formed at the second resonator region.

In some embodiments, it is preferred for the resonator to be selectively sensitive to one or more specific mass analytes. In that case, there may be provided binding sites at the first resonator region for selectively attaching to the mass analyte. The binding sites preferably provide the required selectivity for the one or more specific mass analytes. Preferably, the binding sites are provided at the mass analyte receiving layer. The mass analyte receiving layer may comprise gold. Gold is readily functionalised to provide suitable binding sites.

In some embodiments, the mass analyte is a biologic species. For example, the present invention is of interest for the detection of biomarkers such as cancer biomarkers.

In other embodiments, the resonator may be adapted to detect other mass analytes. For example, the resonator may be adapted to detect the thickness of a deposited layer in a thin film deposition system or process. In that case, the resonator may be located so that the mass analyte (the material being deposited) is received at the first resonator region but not at the second resonator region. This selective deposition may be assisted by the use of a shield to shield the second resonator region. Another example of a similar embodiment is where the mass analyte comprises particulate matter (PM), for example from the atmosphere, the resonator being of use for determining air quality.

In the sensor device, the array of resonators may be formed on a single chip. This allows the device to be fabricated in a manner that allows the resonators to have as uniform a construction and operation as possible. However, in the array, different resonators may be adapted to be sensitive to different mass analytes, allowing the device to provide measurements of different mass analytes.

It is preferred that the resonator is used as a gravimetric-based sensor having a mass sensitivity of about $10^{-15}$ g or better.

Preferably, the method further comprises:
  detecting a shift in one or both of the first and second resonant frequencies and carrying out one or both of (i) and (ii):
  (i) identifying a portion of the shift caused by an environmental change at the sensor other than attachment of the mass analyte selectively at the first resonator region; and
  (Ii) identifying another portion of the shift caused by attachment of the mass analyte selectively at the first resonator region.

The environmental change may for example be a temperature change at the resonator.

The mass analyte may be carried to the resonator in a fluid, such as a liquid or gas.

The resonator may be operated in contact with a liquid (such as an aqueous-based liquid) and/or in contact with a gas (such as air).

The resonator may be operated in transverse shear mode (TSM) or in transverse longitudinal mode (TLM).

As will be understood, the first and second resonator regions are in effect connected in parallel, rather than in series.

In operation, even before the mass analyte is received at the first resonator region, the first and second resonant frequencies are preferably different to each other. This allows the different resonant frequencies to be tracked from the beginning of the method, even before the mass analyte is received at the first resonator region. The difference in the first and second resonant frequencies is attributable to the mass analyte receiving layer at the first resonator region.

Further optional features of the invention are set out below.

BRIEF DESCRIPTION OF THE DRAWINGS

Embodiments of the invention will now be described by way of example with reference to the accompanying drawings in which:

FIG. 2 also shows an optical microscope image of one resonator in the array.

FIG. 16 also shows a schematic of the sensing surface (thiol+blocking/anti-PSA) and target (PSA antigen) detection.

DETAILED DESCRIPTION OF THE PREFERRED EMBODIMENTS, AND FURTHER OPTIONAL FEATURES OF THE INVENTION

In summary, the preferred embodiments of the present disclosure provide a dual resonator acoustic device which is self-compensating and can be used as an advanced tool in gravimetric sensing. Bio-sensing electro-acoustic devices use frequency shifts due to mass accretion after successful target-receptor interactions to track specific biomolecules. However, the device response to target molecules and other environmental factors (i.e. temperature, humidity, pressure) can show considerable variability across devices, leading to poor reliability. The dual resonator device according to the preferred embodiments of the invention has two regions. The first region is sensitive to target molecules by depositing a functional layer (Au). The second region is mass insensitive. Resonators with both a shear mode (about 1 GHz) and a longitudinal mode (about 2 GHz) are fabricated with different Au thicknesses and modelled to illustrate this method. The separation of the two frequencies of the two regions increases by about 50 MHz and about 120 MHz for the shear and longitudinal modes respectively as the Au thickness increases from 0 to 30 nm.

We now set out a discussion of the preferred embodiments of the invention in more detail.

Gravimetric biosensors based on thin film bulk acoustic wave (BAW) resonators have attracted significant interest in recent years mainly due to their high sensitivities. These devices can operate in the GHz frequency range; their sensing principle is based on the resonant frequency shift, $\Delta f_r$, due to mass attachment and this mass sensitivity is proportional to $f_r^2$ according to Sauerbrey.[1] However, these sensors cannot distinguish among different binding molecules, therefore they need a functionalized layer on the surface of the resonator in order to provide a signal representative of selective binding to specific binding molecules. Indeed, such functionalization layers have been reported in DNA sequencing,[2] detection of human fibrinogen,[3] pesticides,[4,5] potassium ions[6] and cancer biomarkers.[7,8] Typical functional layers with biological affinity are known, such as gold, carbon nanotubes, graphene oxide, ZnO nanowires, supramolecular monolayers or titanium dioxide and have been shown to provide suitable selectivity with acoustic wave devices.[6,9-13] Despite this, shifts in frequency are still observed due to changes in the surroundings (i.e. temperature, pressure, humidity) of these devices and cannot be differentiated from "real" mass attachment.[14-16] Such effects pose a major challenge in the reliable detection of low quantities of biological compounds or other deposited material.

Several methods have been proposed to compensate or measure the surrounding conditions of gravimetric BAW resonators. Active compensation techniques using external circuits or a reference device close to resonator are complex and are costly.[17,18]

A passive compensation technique reported by García-Gancedo et al. was based on using a thicker silicon dioxide as the first acoustic reflector layer, which produced two resonances that can be tracked simultaneously to monitor temperature variations and mass attachment.[19] The disclosure in reference 19 corresponds to WO 2013/088163. The $SiO_2$ layer, which is part of the reflector, does not add selectivity to the device and its thermal properties are strongly influenced by the deposition conditions.

Figure 1:
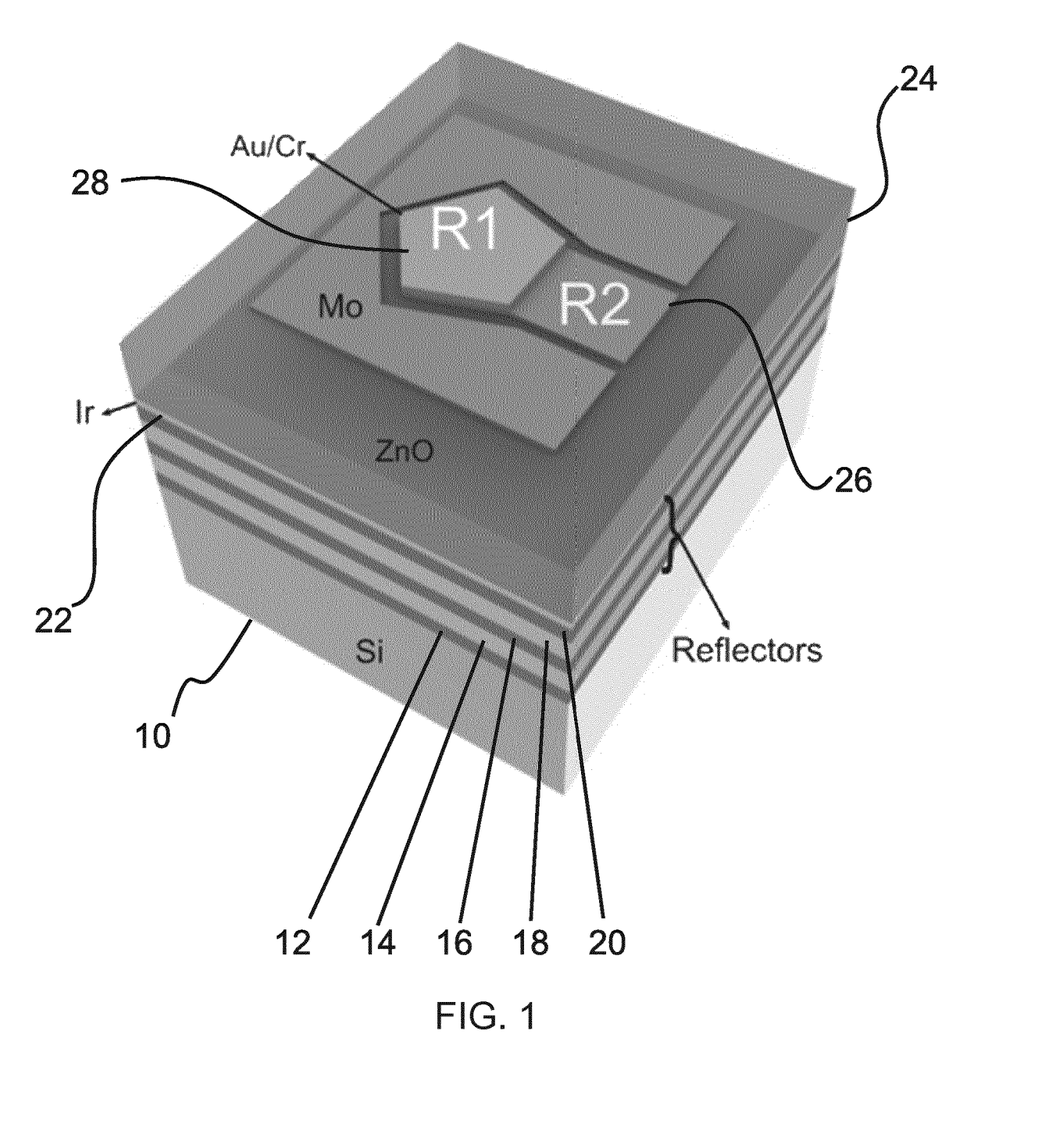
FIG. 1 shows a schematic perspective view of a ZnO based SMR with a functional Au layer only on a pentagonal section of the Mo top electrode corresponding to the first resonator region (R1), the remaining part of the Mo top electrode corresponding to the second resonator region (R2).

In this work a simpler mechanism to split the fundamental resonance mode of the gravimetric sensor into two closely separated distinct frequencies using a functional layer thickness is proposed as shown in FIG. 1. In FIG. 1, the first resonator region (R1) has a functional layer (Au is used as example due to its larger mass density to observe the shifts) that can be functionalized to become sensitive and selective to biological species. The second resonator region (R2) without the functional layer has negligible frequency shifts since it is not selective to the biological species. Therefore, the second resonator region can be used for calibrating Au thickness and other surface effects. In this manner a selfreferenced device is achieved, which obviates the need for prior knowledge of the initial resonant frequency as the separation of the resonances can be used as the sensing mechanism for mass attachment. In this work the effect of Au thickness on the resonance spectral separation is modelled and characterized by fabricating ZnO based solidly mounted resonators (SMRs).

FIG. 1 shows in general the construction of the SMR device. Substrate 10 (formed of single crystal Si) has a series of alternating reflector layers 12, 14, 15, 18, 20. Bottom electrode 22 is formed over the reflector layers. Bottom electrode 22 may be formed of Ir, for example. Piezoelectric layer 24 is formed over the bottom electrode 22. A suitable material for the piezoelectric layer is ZnO. On top of the piezoelectric layer is formed top electrode 26, defining the first resonator region R1 and the second resonator region R2. A suitable material for the top electrode 26 is Mo. At the first resonator region R1, a layer 28 of Au or Au/Cr is formed. There is no corresponding layer formed at the second resonator region R2.

Figure 2:
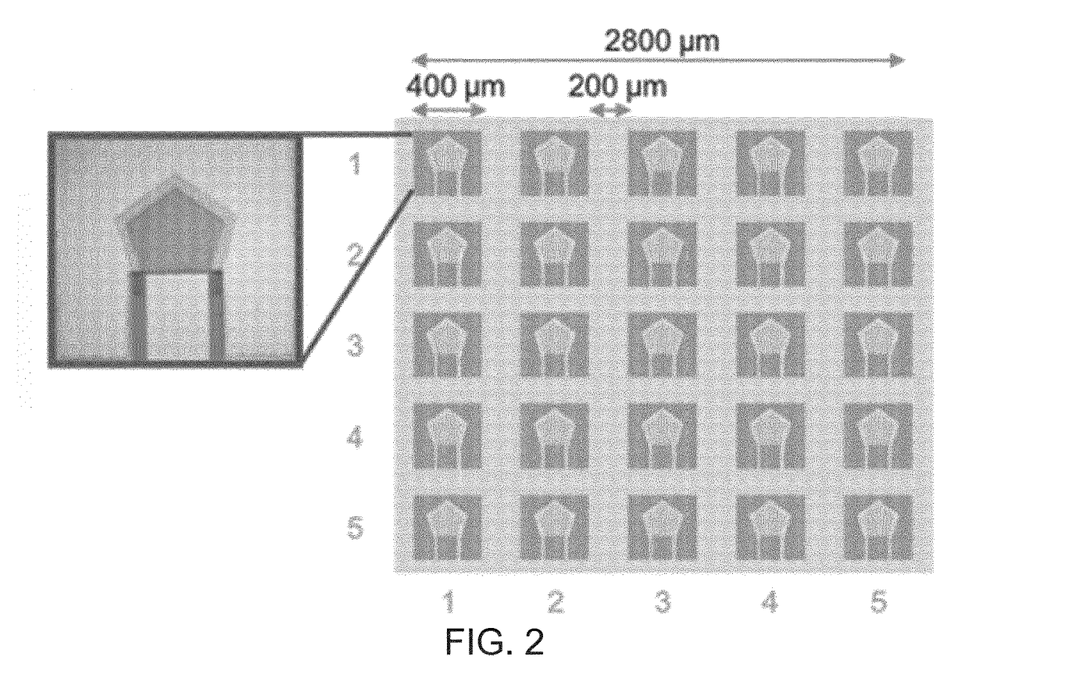
FIG. 2 shows a schematic view of the layout of a one chip device array (5×5) in which 25 resonators are arrayed.

FIG. 2 shows a schematic view of the layout of a one chip device array (5×5) in which 25 resonators are arrayed. FIG. 2 also shows an optical microscope image of one resonator in the array. As can be seen in FIG. 1 and FIG. 2, the first resonator region has a generally pentagonal shape in plan view. This low symmetry shape is of use to suppress unwanted resonances or harmonics that may arise due to reflections at the edges of the electrode.

Figure 3:
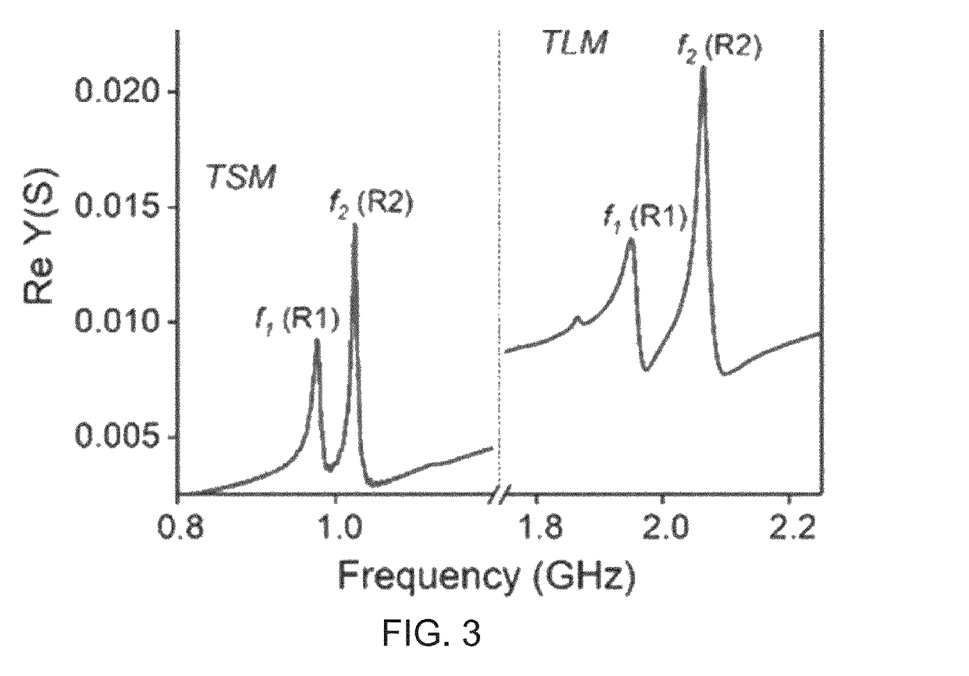
FIG. 3 shows a typical frequency split ($f_1/f_2$) due to the two resonator regions (R1 and R2) observed in both the thickness shear mode (TSM) and thickness longitudinal mode (TLM) of the same device.
Figure 4:
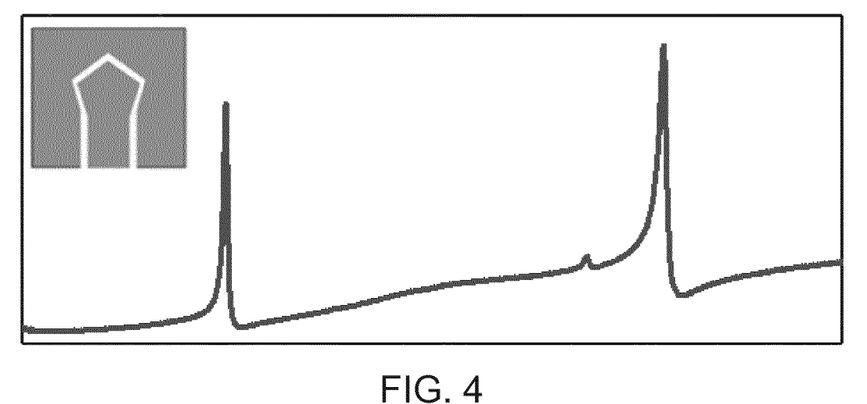
FIG. 4 shows a schematic plot of the resonant behaviour of a resonator prior to deposition of gold to form the first resonator region (R1).
Figure 5:
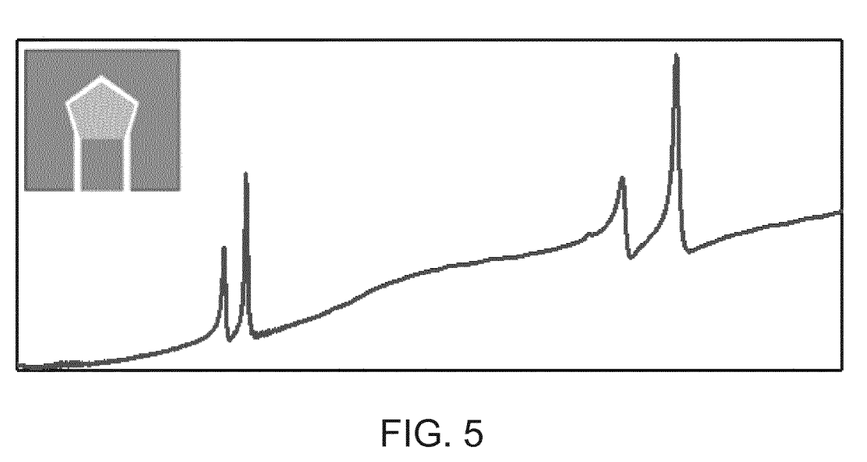
FIG. 5 shows a schematic plot of the resonant behaviour of the resonator of FIG. 4 after deposition of gold to form the first resonator region (R1).

FIG. 3 shows a typical frequency split ($f_1/f_2$) due to the two resonance regions (R1 and R2) observed in both the thickness shear mode (TSM) and thickness longitudinal mode (TLM) of the same device. FIGS. 4 and 5 show the effect of the deposition of gold to form the first resonator region (R1) on the resonance. No scales are indicated in FIGS. 4 and 5 but it can be seen that the data of FIG. 5 corresponds to that of FIG. 3.

Figure 6:
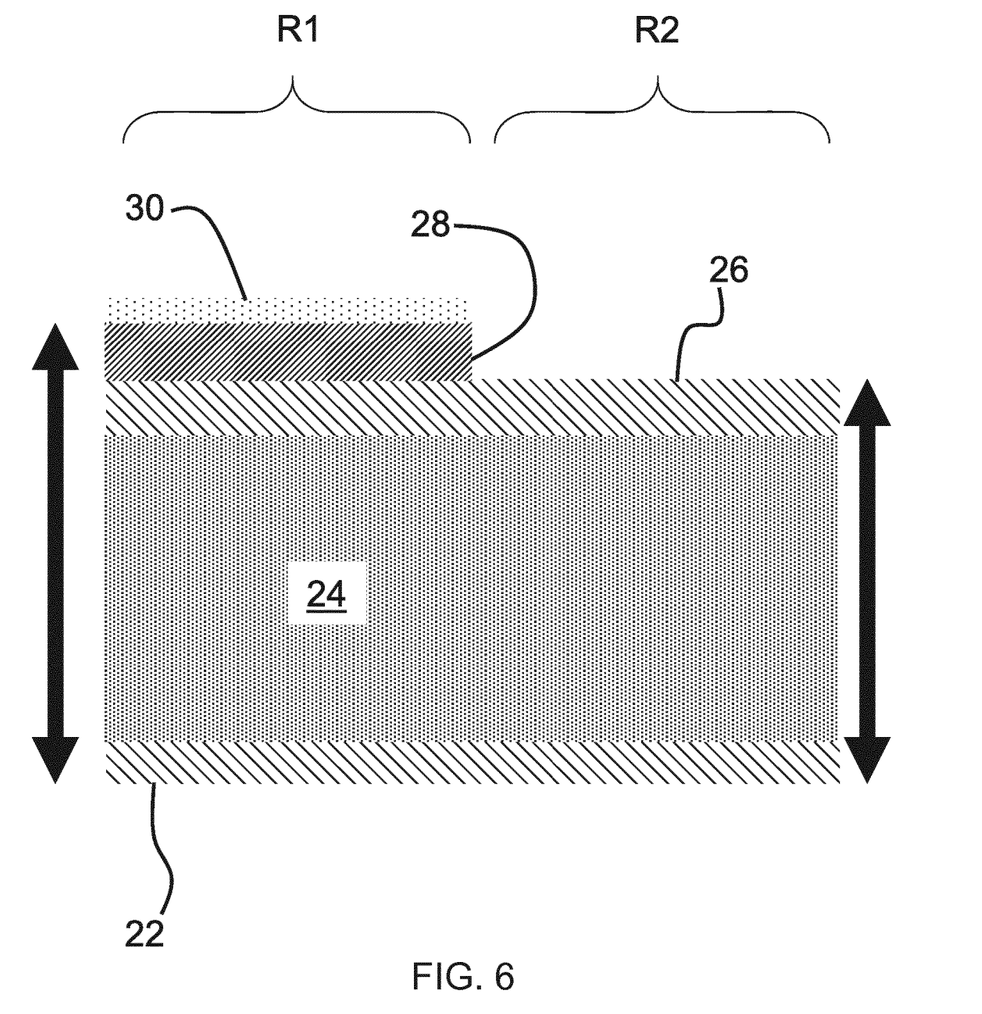
FIG. 6 shows a schematic cross sectional view through the first and second resonator regions of a resonator according to an embodiment of the invention.
Figure 7:
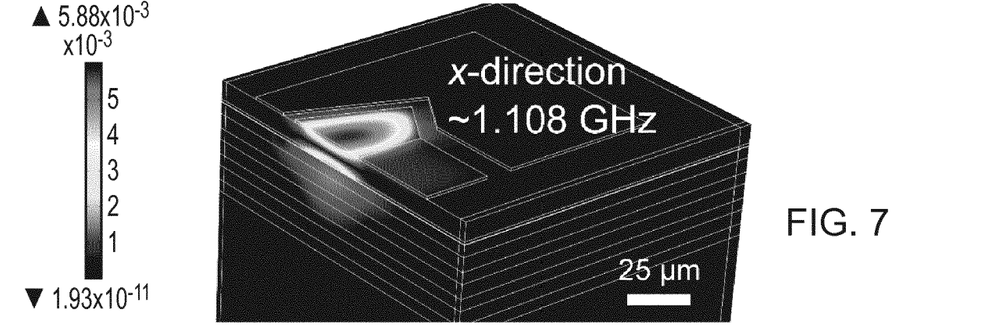
FIGS. 7-10 show displacement maps in the x and the z directions from FEM simulation demonstrating the resonator regions (R1 and R2) vibrating at different frequencies.
Figure 8:
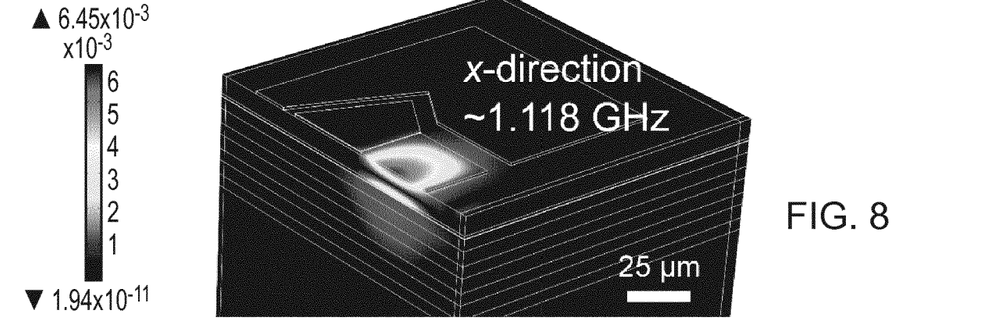
Figure 9:
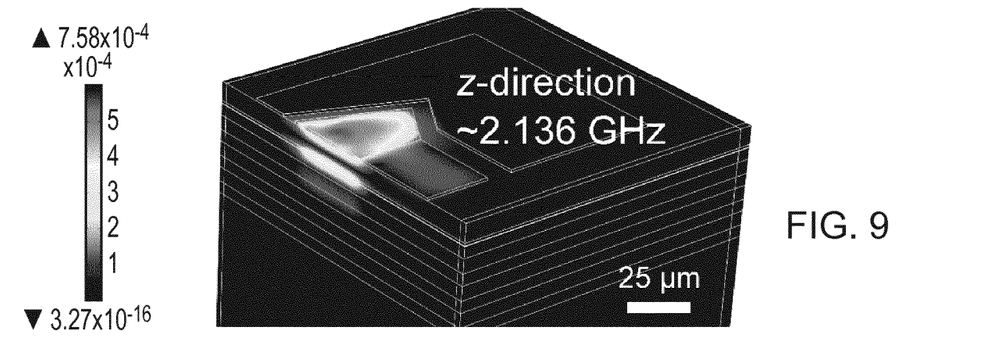
Figure 10:
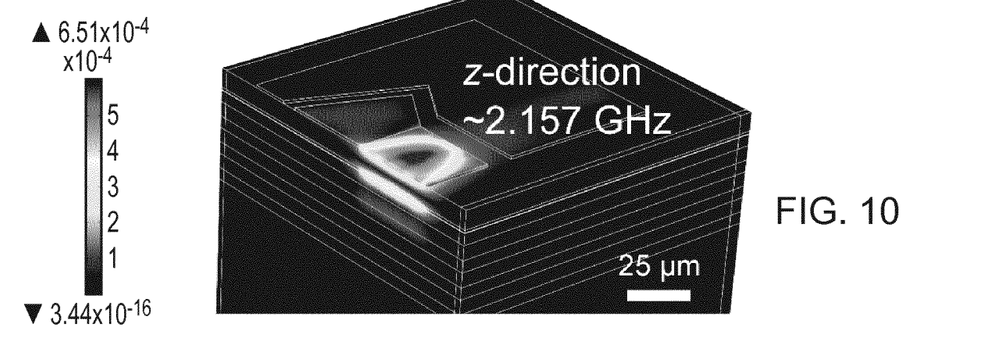

FIG. 6 shows a schematic cross sectional view through the first and second resonator regions of a resonator according to an embodiment of the invention. Note that the substrate and reflectors shown in FIG. 1 are omitted. Au layer 28 is formed only at first resonator region R1 and not at second resonator region R2. There is shown a layer of mass analyte 30 attached to Au layer 28.

Finite element method (FEM) simulations shown in FIGS. 7-10 demonstrate the resonator region that is activated at different frequencies. Specifically, FIGS. 7-10 show displacement maps in the x and the z directions from FEM simulation demonstrating the resonator regions (R1 and R2) vibrating at different frequencies.

Figure 11:
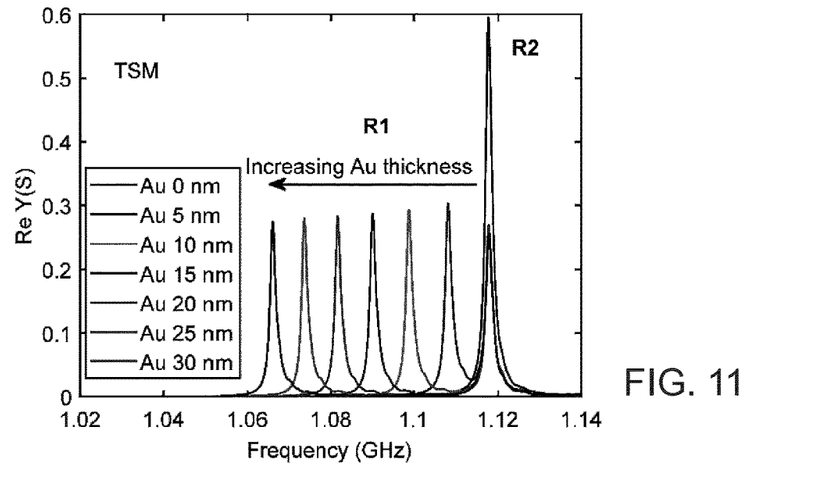
FIG. 11 shows FEM simulated spectra of the TSM split resonances for different Au thicknesses at the first resonator region (R1) showing the spectral shift observed for R1.
Figure 12:
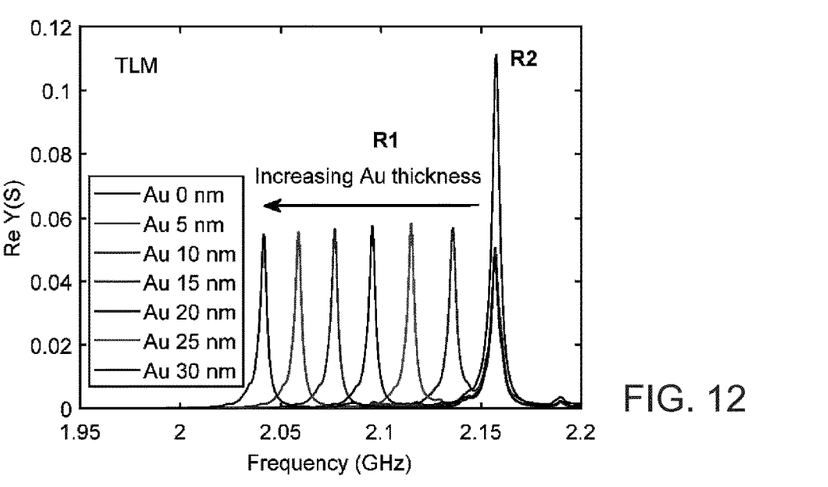
FIG. 12 shows corresponding FEM simulated spectra to FIG. 11 but of the TLM split resonances for different Au thickness.
Figure 13:
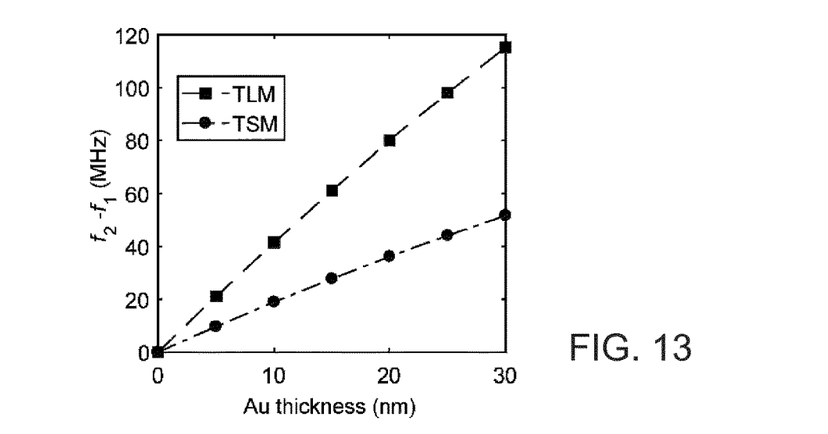
FIG. 13 shows a plot of the difference between the FEM simulated resonant frequencies of R2 and R1 for the TSM and TLM depending on the Au thickness at the first resonator region (R1).

FIG. 11 shows FEM simulated spectra of the TSM split resonances for different Au thicknesses at the first resonator region (R1) showing the spectral shift observed for R1. FIG. 12 shows corresponding FEM simulated spectra to FIG. 11 but of the TLM split resonances for different Au thickness. FIG. 13 shows a plot of the difference between the FEM simulated resonant frequencies of R2 and R1 for the TSM and TLM depending on the Au thickness at the first resonator region (R1).

The lower frequency ($f_1$) corresponds to the first resonator region (R1) whereas the higher frequency ($f_2$) corresponds to the second resonator region (R2) only, for both the thickness shear mode (TSM) and the thickness longitudinal mode (TLM). The separation of the split resonances depends on the Au thickness, and increases with a thicker Au layer, as shown in FIGS. 11-13. Without the Au/Cr layer 28, the SMR exhibits a single resonance as shown in FIGS. 11 and 12 and the admittance amplitude is higher than when a layer of Au/Cr is attached because of the reduced size of the uncoated region. The FEM simulations in FIGS. 11-13 illustrate the frequency separation, which is approximately linear within the Au thickness range investigated.

Figure 14:
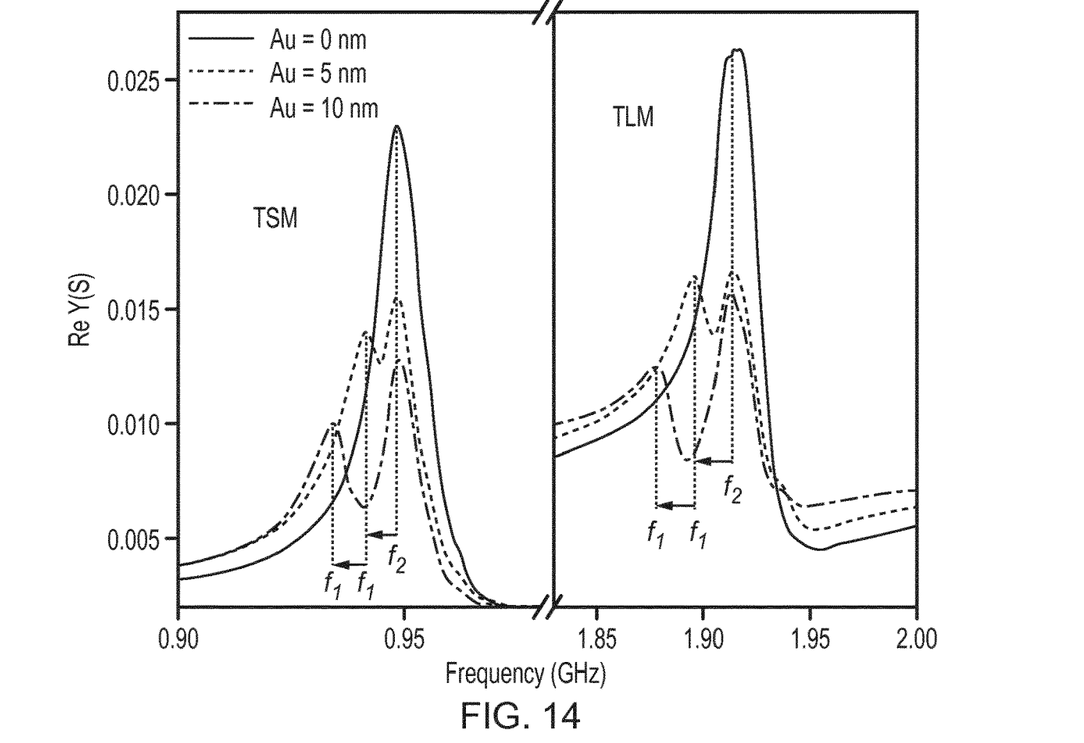
FIG. 14 indicates the increasing frequency difference between split resonances ($f_2$ and $f_1$) measured in a representative SMR device due to gradual Au deposition at the pentagonal section of the Mo top electrode, corresponding to the first resonator region (R1). The left hand plot shows TSM and the right hand plot shows TLM. Each of these shows a single mode for 0 nm of Au and split modes at different frequencies for 5 and 10 nm of Au.
Figure 15:
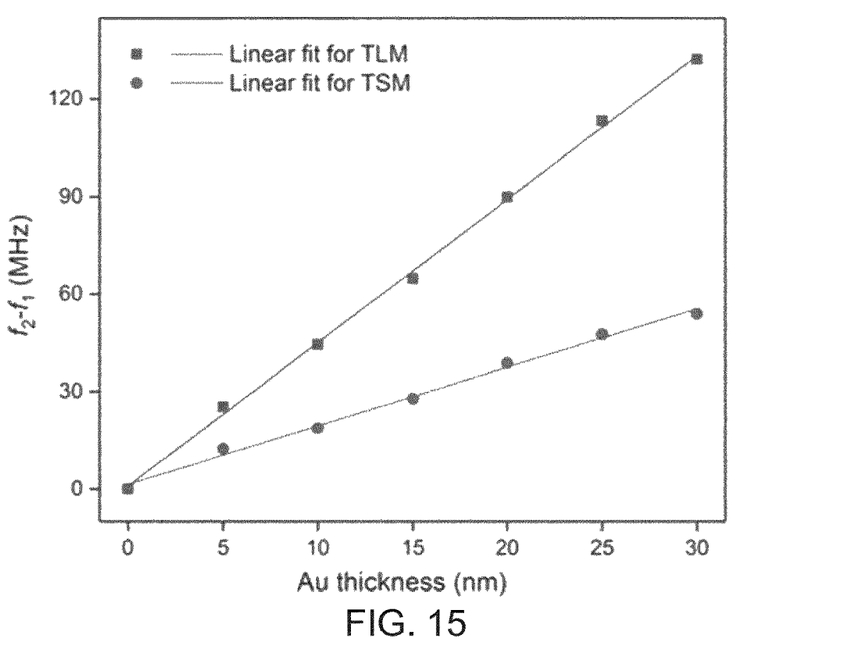
FIG. 15 shows the measured difference between the resonant frequencies ($f_2$ and $f_1$) for the TSM and TLM depending on the Au thickness.

The electro-acoustic responses of fabricated split mode resonators according to preferred embodiments of the invention are shown in FIGS. 14 and 15. FIG. 14 indicates the increasing frequency difference between split resonances ($f_2$ and $f_1$) measured in a representative SMR device due to gradual Au deposition at the pentagonal section of the Mo top electrode, corresponding to the first resonator region (R1). The left hand plot shows TSM and the right hand plot shows TLM.

Each of these shows a single mode for 0 nm of Au and split modes at different frequencies for 5 and 10 nm of Au. FIG. 15 shows the measured difference between the resonant frequencies ($f_2$ and $f_1$) for the TSM and TLM depending on the Au thickness.

After the deposition of the Au/Cr layer 28 on the pentagonal section of the Mo top electrode of the SMR device, a clear split of the TSM and TLM in FIG. 14 into two distinct frequencies is observed. Similar to the FEM simulations, $f_1$ that appears after Au deposition shifts towards lower frequencies, whilst the original resonance ($f_2$) stays at the same frequency region at all times. This is because the added Au/Cr layer acts as a mass load on the first resonator region (R1). The experimental ($f_2-f_1$) plotted in FIG. 15 is slightly different to the simulated ($f_2-f_1$) probably due to uncertainty in the thickness or the assumption of ideal material properties. In addition the acoustic losses of thicker Au layers cause significant damping of the resonance in the experiments.

Accordingly, it is shown here that the two fundamental modes of resonance thickness shear mode (TSM) and thickness longitudinal mode (TLM) are present at a low frequency region (about 0.95-1.2 GHz) and a high frequency region (about 1.9-2.2 GHz), respectively. They split into two closely separated distinct resonances after thermal evaporation of Au on the pentagonal section of the Mo top electrode of the SMR device, corresponding to the first resonator region (R1).

It is worthwhile noting that the devices presented here are based on both TSM and TLM, rendering these devices suitable for sensing in both liquid and gas environments.[20] The advantage of having mass sensitive and mass insensitive modes in a single device results in much more controllable and reliable tracking tool for various molecule detection, whilst eliminating other surface effects (e.g. temperature, humidity, pressure). This therefore helps to avoid undesirable false responses without the need for additional reference devices or complicated electronics. Another benefit of having the split resonances is the fact that significant deviations of the resonant frequencies across devices are due to thickness variation and orientation of the piezoelectric layer in BAW resonators. In particular this affect devices operating in the shear resonance that need off-axis piezoelectric layers, which cannot be grown uniformly over large substrates.[16,20] Having two frequencies—one that is mass sensitive and one that is mass insensitive—in this case provides each sensor with its own reference resonant frequency to extract the frequency shift, and eventually the amount of target molecules detected.

The resonators disclosed here have applications in the sensing of cancer biomarkers for example.

Experimental

FEM Simulation

FEM simulations were carried out using COMSOL® Multiphysics 5.3 (solid mechanics and electrostatics module) in 3D with the dimensions of the SMR fabricated. Due to the symmetry of the device, only half of the structure was simulated to reduce computation time. For each resonance region, 500 frequency points were simulated using a free triangular mesh with a 2 µm minimum element size to generate 106074 degrees of freedom to solve. Material properties from the default COMSOL® Multiphysics library are used.

Device Fabrication

The fabrication process of the shear and longitudinal mode ZnO based SMRs is described in our previous works. [11,20] After the SMR fabrication, the pentagonal region for the functional layer is defined by standard ultra-violet photolithography using AZ2020 nLoF photoresist. By means of thermal evaporation (E306, Edwards, West Sussex, UK), 5 nm of Cr is deposited as adhesion layer for the subsequent Au layer, the thickness of which is varied from 5 to 30 nm. Lift-off is carried out in n-methyl-2-pyrrolidone, acetone, iso-propanol and de-ionized water to leave a pentagonal shape region (area of $1.42 \times 10^{-4}$ cm$^2$) on the resonator with the added Au/Cr layer.

Electro-Acoustic Characterization

Fabricated SMRs are then characterized on a coplanar probe station by measuring the impedance (Z) in the frequency range from 0.5 GHz to 3.0 GHz using 150 µm pitch ground-signal-ground radio-frequency (RF) probes (Picoprobes, GGB industries Inc., Naples, Fla., USA), connected to a vector network analyzer (Model E5062A, Keysight Technologies, Santa Rosa, Calif., USA).

There follows a description of a dual resonator (2R) FBAR biosensor for PSA antigen detection from EDTA whole blood sample, according to an embodiment of the invention.

Materials

Thiol molecule, 11-mercaptoundecanoic acid (11-MUA) was purchased from ChemCruz; 6-mercapto-1-hexanol, ethanolamine, 1-ethyl-3-(3-dimethylaminopropyl) carbodiimide hydrochloride (EDC), N-hydroxysuccinimide (NHS) were purchased from Sigma-Aldrich (Merck); Anti-PSA polyclonal capture antibody was purchased from GeneTech; EDTA whole blood samples were used as received from Addenbrookes hospital, Cambridge UK.

Methods

Self-assembled monolayers (SAMs) of thiolate compound were formed by the spontaneous chemisorption of thiolate groups on Au surface. For the SAM formation on gold, the devices were immersed in the freshly prepared 5 mM 11-mercaptoundecanoic acid (11-MUA) in ethanolic solution for 24 hours at 4° C. This formed a SAM of the alkanethiol on the gold active area on the FBAR. Next, the modified surface was rinsed with ethanol to remove any unbound molecules and dried with nitrogen. Formation of SAM was followed by additional surface-blocking step with ethanolic solution of 6-mercapto-1-hexanol (0.1 M) for 1 hour at RT and followed by ethanol rinsing/nitrogen drying steps.

For antibody coupling, treatment of water-soluble carbodiimide and succinimide compounds was performed immediately by immersing the devices in EDC (0.2M) and NHS (50 mM) for 30 min followed by rinsing with MiliQ water. This activates the carboxylic acid terminated-group on the modified gold surfaces. Capture antibodies (anti-PSA, polyclonal) were covalently immobilized on the NHS-activated SAM by spotting with 10 µL of a 0.5 mg/mL solution for 1 h at RT. For control measurements, no capture antibody was attached in this step. The remaining NHS-active ester sites were blocked with 1.0 M ethanolamine pH 8.5 for 30 min at RT. The prepared devices were subsequently used for the PSA antigen detection from the whole blood samples.

EDTA whole blood samples containing various concentrations of PSA antigen were used as received. The PSA concentrations for each sample were previously determined by ELISA. A small volume (10 µL) of blood samples from 7 patients were applied on the antibody-modified Au active surface and left to incubate for 15 min to allow the recognition of the target protein by the immobilized receptors. After extensive rinsing with MiliQ water and drying with nitrogen, devices were measured on a network analyzer (NA-E5062A).

Results

Figure 16:
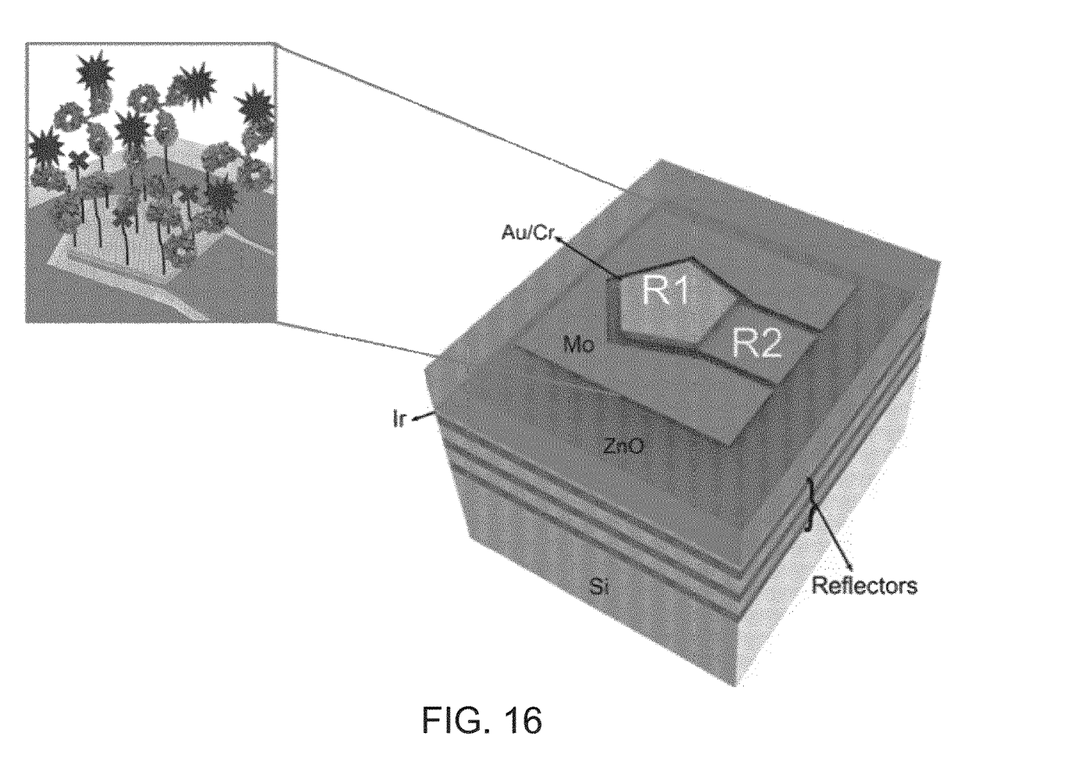
FIG. 16 shows a schematic of the device architecture of a 2R FBAR biosensor with the functional Au layer only on a pentagonal section of the Mo top electrode, similar to the arrangement shown in FIG. 1. The regions corresponding to the first ($R1/f_1$) and second ($R2/f_2$) resonances are shown.

FIG. 16 shows a schematic of 2R FBAR biosensor, where the resonator (R1) with Au layer is functionalized with thiol molecules and capture antibody (anti-PSA). That prepared surface is selective to the PSA antigen detection.

Figure 17:
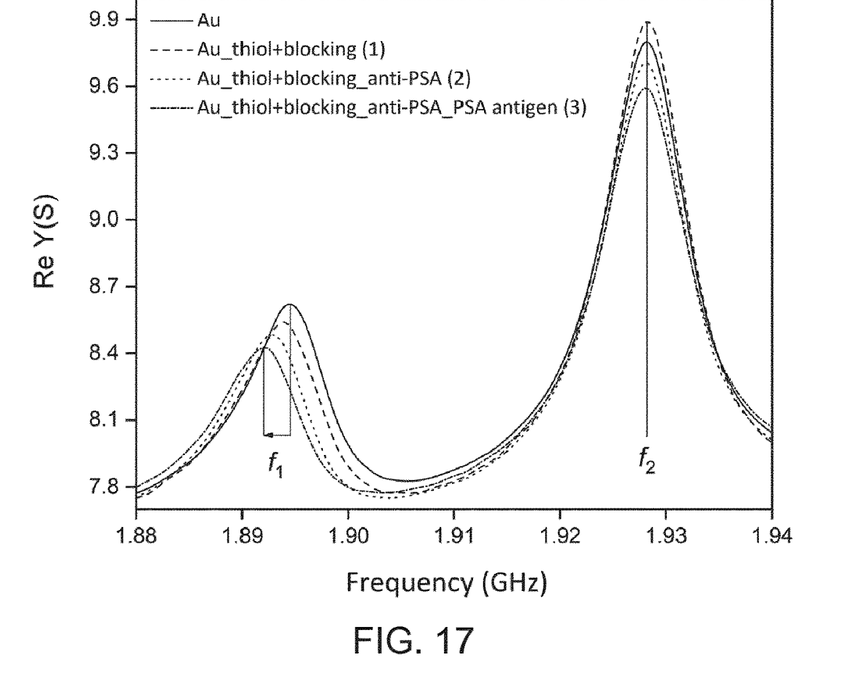
FIG. 17 shows the performance of a device according to an embodiment of the invention, in which there is an increase in the difference between the two resonances $f_2-f_1$ observed in the 2R FBAR sensor due to the attachment of subsequent molecules ((1) thiols; (2) anti-PSA; (3) PSA antigen) onto the Au active surface.

The sensor response to the attachment of the (1) thiol (11-MUA)+blocking (6-mercapto-1-hexanol), (2) anti-PSA, (3) PSA antigen onto Au active surface was monitored by measuring the real part of the electrical admittance (Y) in the frequency range from 0.5 GHz to 3.0 GHz and it is shown in FIG. 17.

Figure 18:
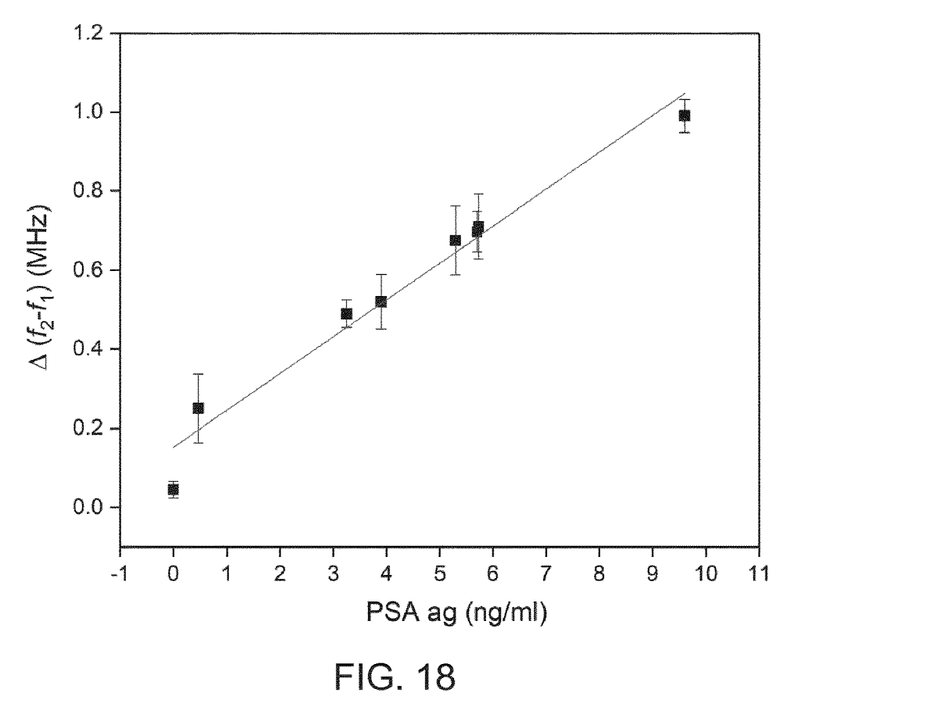
FIG. 18 shows a linear fit for the gravimetric detection of PSA antigen from EDTA whole blood samples of known concentrations (determined by ELISA); point zero represents control measurements where no capture antibody (anti-PSA) was attached to the sensor surface.

In this experiment, the developed sensor was applied to the detection of PSA from EDTA whole blood samples from cancer patients. As can be seen from FIG. 18, we obtained a linear trend in a PSA detection from a complex matrix, such as whole blood. Direct PSA detection from the whole blood significantly reduces time of the test as there is no need for sample pre-treatment and therefore it can simplify the whole process of PSA testing. To measure specificity of the assay, we performed control measurements, where no anti-PSA capture antibody was attached to the sensing surface of the FBAR sensor. For this, no significant response was obtained after incubation with EDTA whole blood samples. This indicates low non-specific interactions with FBAR sensor's surface and shows good selectivity for PSA antigen detection.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above and/or listed below are hereby incorporated by reference.

LIST OF NON-PATENT DOCUMENT REFERENCES

[1] G. Sauerbrey, *Zeitschrift für Phys.* 1959, 155, 206.
[2] M. Nirschl, A. Blüher, C. Erler, B. Katzschner, I. Vikholm-Lundin, S. Auer, J. Vörös, W. Pompe, M. Schreiter, M. Mertig, *Sensors Actuators, A Phys.* 2009, 156, 180.
[3] L. García-Gancedo, J. Pedrós, E. Iborra, M. Clement, X. B. Zhao, J. Olivares, J. Capilla, J. K. Luo, J. R. Lu, W. I. Milne, A. J. Flewitt, *Sensors Actuators, B Chem.* 2013, 183, 136.
[4] W. H. Liu, D. Chen, Y. Xu, P. Wang, J. J. Wang, *Electron. Lett.* 2013, 49, 924.
[5] D. Chen, J. Wang, Y. Xu, D. Li, *Sensors Actuators B Chem.* 2012, 171-172, 1081.
[6] H. Zhang, W. Pang, M. S. Marma, C.-Y. Lee, S. Kamal-Bahl, E. S. Kim, C. E. McKenna, *Appl. Phys. Lett.* 2010, 96, 123702.
[7] T. Y. Lee, J. T. Song, *Thin Solid Films* 2010, 518, 6630.

[8] D. Chen, J. J. Wang, D. H. Li, Z. X. Li, *Electron. Lett.* 2011, 47, 1169.
[9] L. García-Gancedo, Z. Zhu, E. Iborra, M. Clement, J. Olivares, A. J. Flewitt, W. I. Milne, G. M. Ashley, J. K. Luo, X. B. Zhao, J. R. Lu, *Sensors Actuators B Chem.* 2011, 160, 1386.
[10] X. Zhao, F. Pan, G. M. Ashley, L. Garcia-Gancedo, J. Luo, A. J. Flewitt, W. I. Milne, J. R. Lu, *Sensors Actuators B Chem.* 2014, 190, 946.
[11] X. Le, X. Wang, J. Pang, Y. Liu, B. Fang, Z. Xu, C. Gao, Y. Xu, J. Xie, *Sensors Actuators, B Chem.* 2017, 255, 2454.
[12] Y. Lu, Y. Chang, N. Tang, H. Qu, J. Liu, W. Pang, H. Zhang, D. Zhang, X. Duan, *ACS Appl. Mater. Interfaces* 2015, 7, 17893.
[13] D. Singh, A. A. Narasimulu, L. Garcia-Gancedo, Y. Q. Fu, T. Hasan, S. S. Lin, J. Geng, G. Shao, J. K. Luo, *J. Mater. Chem. C* 2013, 1, 2525.
[14] I. Katardjiev, V. Yantchev, *Vacuum* 2012, 86, 520.
[15] X. L. He, L. Garcia-Gancedo, P. C. Jin, J. Zhou, W. B. Wang, S. R. Dong, J. K. Luo, A. J. Flewitt, W. I. Milne, *J. Micromechanics Microengineering* 2012, 22, 125005.
[16] G. Rughoobur, M. DeMiguel-Ramos, J.-M. Escolano, E. Iborra, A. J. Flewitt, *Sci. Rep.* 2017, 7, 1367.
[17] S. Razafimandimby, C. Tilhac, A. Cathelin, A. Kaiser, D. Belot, *Analog Integr. Circuits Signal Process.* 2006, 49, 237.
[18] S. Rai, Y. Su, W. Pang, R. Ruby, B. Otis, *IEEE Trans. Ultrason. Ferroelectr. Freq. Control* 2010, 57, 552.
[19] L. García-Gancedo, J. Pedrós, X. B. Zhao, G. M. Ashley, A. J. Flewitt, W. I. Milne, C. J. B. Ford, J. R. Lu, J. K. Luo, *Biosens. Bioelectron.* 2012, 38, 369.
[20] G. Rughoobur, M. DeMiguel-Ramos, T. Mirea, M. Clement, J. Olivares, B. Díaz-Durán, J. Sangrador, I. Miele, W. I. Milne, E. Iborra, A. J. Flewitt, *Appl. Phys. Lett.* 2016, 108, 34103.

The invention claimed is:

1. A resonator for the detection of a mass analyte, the resonator comprising:
a piezoelectric layer formed of a piezoelectric material;
a first resonator region and a second resonator region each occupying a corresponding region of the piezoelectric layer;
electrodes disposed to apply a driving signal to the piezoelectric layer to generate bulk acoustic waves, the electrodes being common to the first resonator region and the second resonator region;
in operation, the first resonator region having a first resonant frequency and the second resonator region having a second resonant frequency;
wherein the first resonator region and the second resonator region differ from each other in that the first resonator region is adapted to receive a mass analyte for the mass analyte selectively to attach to a surface of the first resonator region,
wherein, in operation, attachment of the mass analyte selectively at the first resonator region causes a greater frequency shift in the first resonant frequency than in the second resonant frequency,
wherein the first and second resonator regions are formed as parts of the same resonator,
wherein the first resonator region comprises a mass analyte receiving layer, and
wherein the first resonant frequency ($f_1$) and the second resonant frequency ($f_2$) are different to each other, even before the mass analyte is received at the first resonator region (R1).

2. The resonator according to claim 1 wherein the first and second regions are contiguous parts of the same resonator.

3. The resonator according to claim 1 wherein the electrodes sandwich the piezoelectric layer.

4. The resonator according to claim 1 wherein the first and second resonant frequencies are each greater than 0.5 GHz.

5. The resonator according to claim 1 wherein the resonator is a solidly mounted resonator (SMR) with an acoustic wave reflector structure arranged under the piezoelectric layer and electrodes.

6. The resonator according to claim 1 wherein the mass analyte receiving layer comprises binding sites at the first resonator region for selectively attaching to the mass analyte.

7. A sensor device comprising an array of resonators, each resonator in said array comprising:
a piezoelectric layer formed of a piezoelectric material;
a first resonator region and a second resonator region each occupying a corresponding region of the piezoelectric layer;
electrodes disposed to apply a driving signal to the piezoelectric layer to generate bulk acoustic waves, the electrodes being common to the first resonator region and the second resonator region;
in operation, the first resonator region having a first resonant frequency and the second resonator region having a second resonant frequency;
wherein the first resonator region and the second resonator region differ from each other in that the first resonator region is adapted to receive a mass analyte for the mass analyte selectively to attach to a surface of the first resonator region,
wherein, in operation, attachment of the mass analyte selectively at the first resonator region causes a greater frequency shift in the first resonant frequency than in the second resonant frequency,
wherein the first and second resonator regions are formed as parts of the same resonator,
wherein the first resonator region comprises a mass analyte receiving layer, and
wherein the first resonant frequency ($f_1$) and the second resonant frequency ($f_2$) are different to each other, even before the mass analyte is received at the first resonator region (R1).

8. The sensor device according to claim 7 wherein the array of resonators is formed on a single chip.

9. A method for detecting a mass analyte, the method comprising providing a resonator comprising:
a piezoelectric layer formed of a piezoelectric material;
a first resonator region and a second resonator region each occupying a corresponding region of the piezoelectric layer;
electrodes disposed to apply a driving signal to the piezoelectric layer to generate bulk acoustic waves, the electrodes being common to the first resonator region and the second resonator region,
the method further comprising:
operating the resonator to detect a first resonant frequency, corresponding to the first resonator region, and a second resonator frequency, corresponding to the second resonator region;
selectively receiving a mass analyte at the first resonator region, attachment of the mass analyte selectively at the first resonator region causing a greater frequency shift in the first resonant frequency than in the second resonant frequency, wherein the first and second resonator regions are formed as parts of the same resonator, wherein the first resonator region comprises a mass analyte receiving layer, and wherein the first resonant frequency ($f_1$) and the second resonant frequency ($f_2$) are different to each other, even before the mass analyte is received at the first resonator region (R1).

10. The method according to claim 9 wherein the method further comprises:

detecting a shift in one or both of the first and second resonant frequencies and carrying out one or both of (i) and (ii):

(i) identifying a portion of the shift caused by an environmental change at the sensor other than attachment of the mass analyte selectively at the first resonator region; and (ii) identifying another portion of the shift caused by attachment of the mass analyte selectively at the first resonator region.

11. The method according to claim 10 wherein the environmental change is a temperature change at the resonator.

12. The resonator according to claim 1 wherein the mass analyte receiving layer comprises a metal layer.

13. The sensor device according to claim 7 wherein the mass analyte receiving layer comprises a metal layer.

14. The method according to claim 9 wherein the mass analyte receiving layer comprises a metal layer.

* * * * *